July 2, 1968 J. PENRAAT 3,390,467
VISUAL AID TEACHING MACHINE
Filed July 29, 1966 4 Sheets-Sheet 1
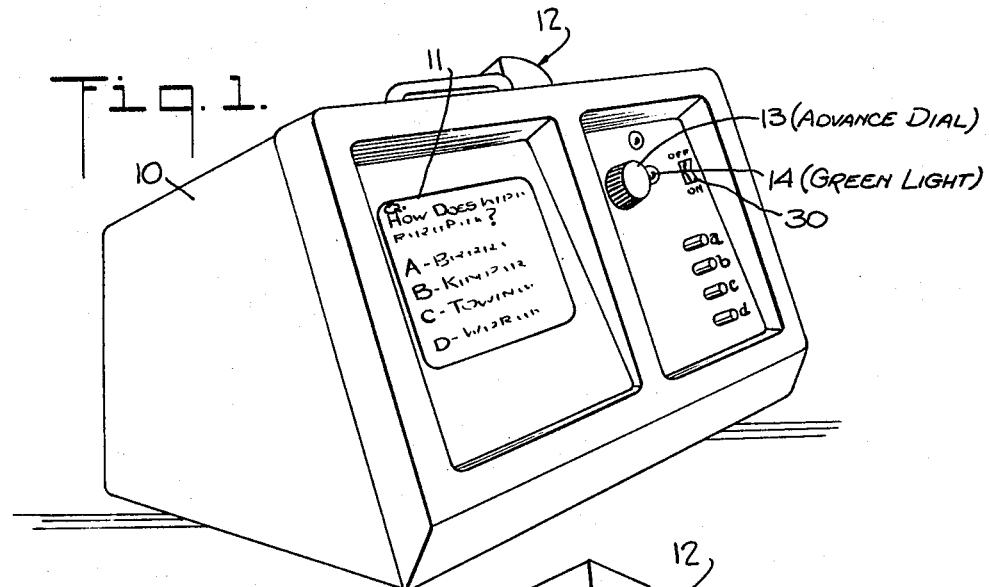
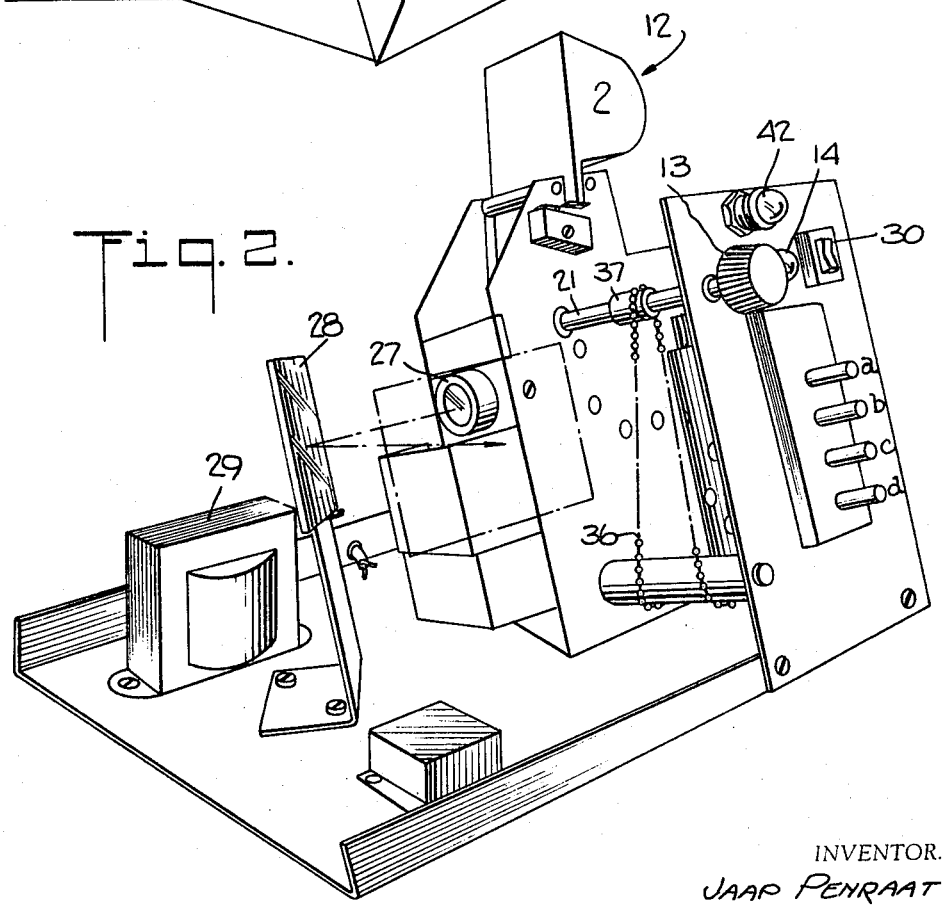
INVENTOR.
JAAP PENRAAT
BY
ATTORNEY

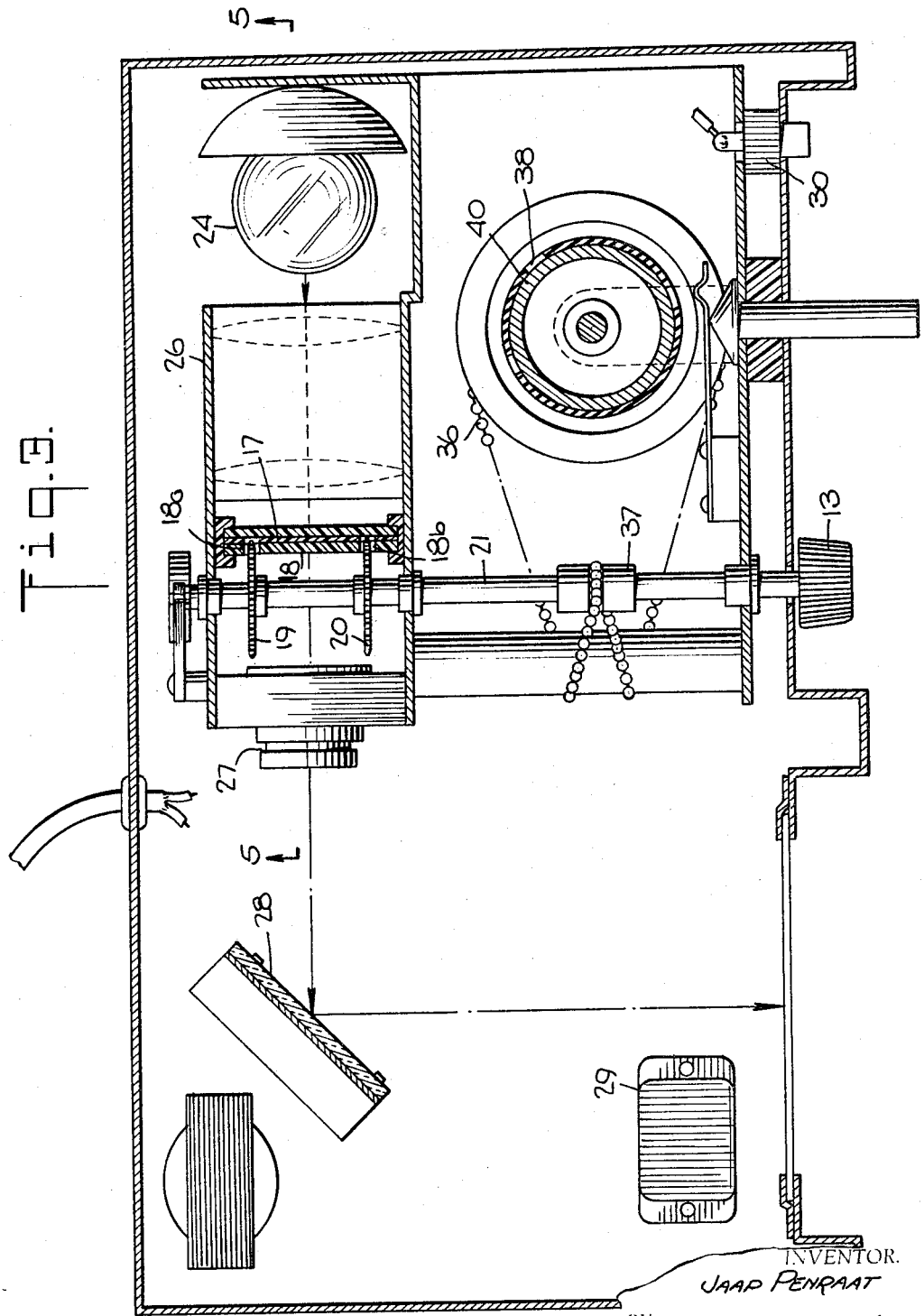

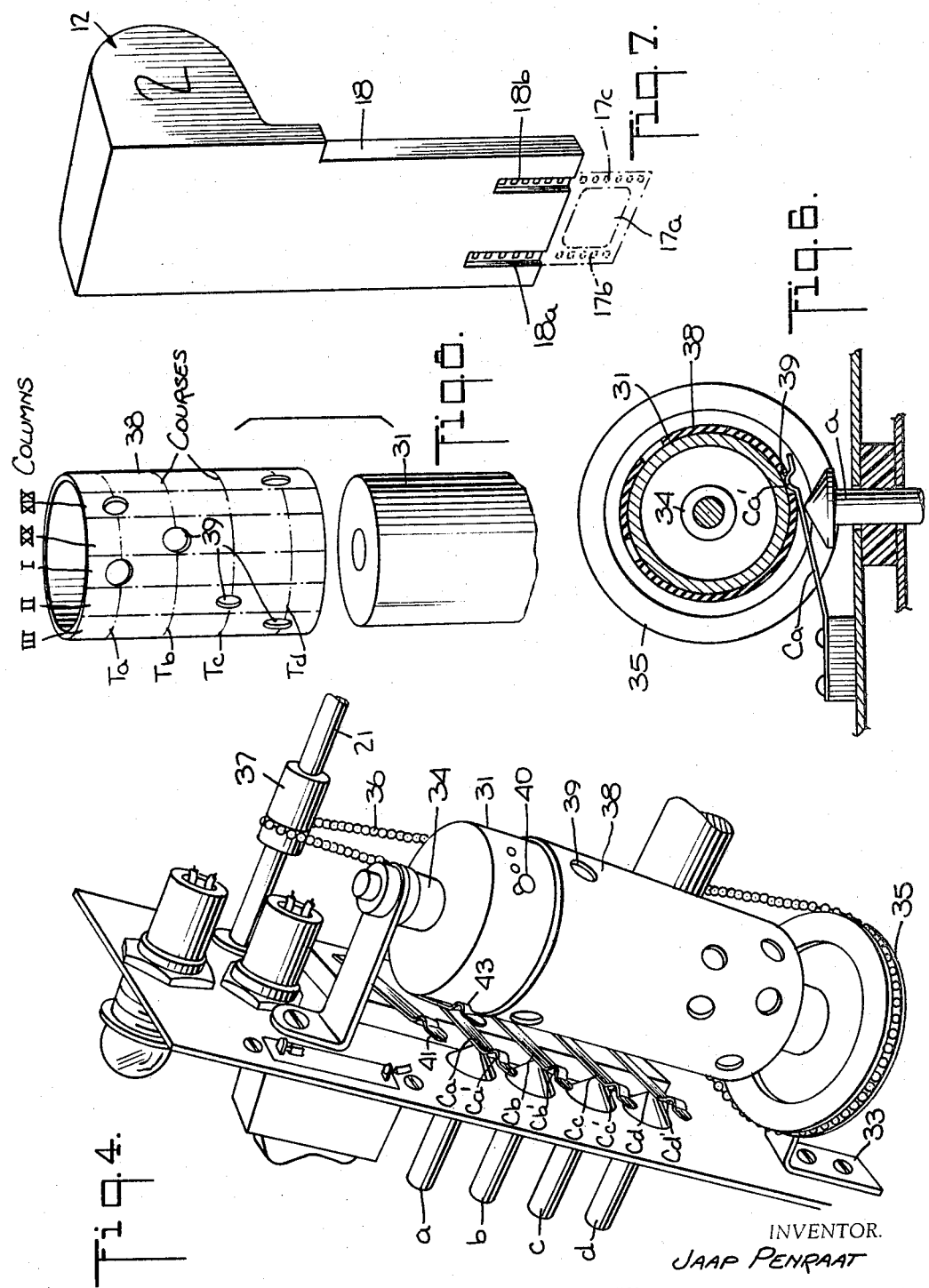

July 2, 1968  J. PENRAAT  3,390,467
VISUAL AID TEACHING MACHINE
Filed July 29, 1966  4 Sheets-Sheet 4
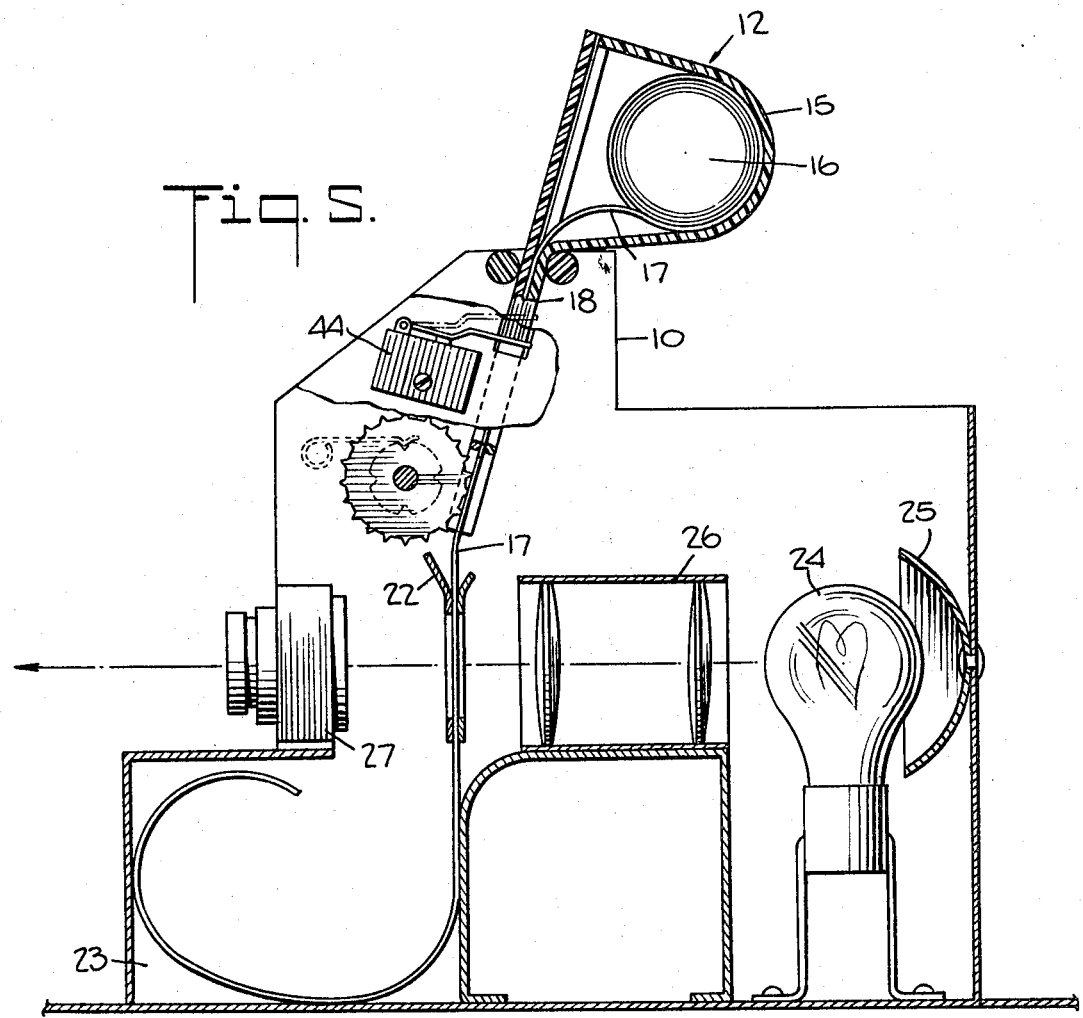
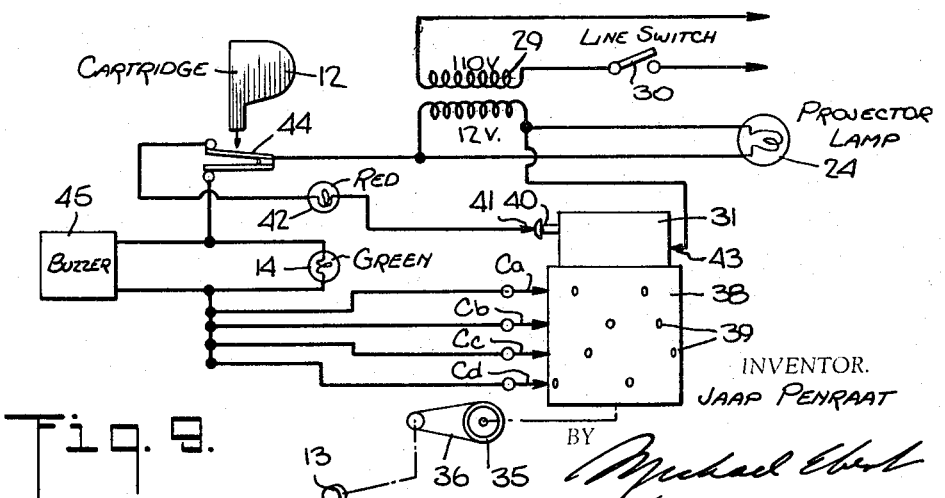

3,390,467
VISUAL AID TEACHING MACHINE
Jaap Penraat, New York, N.Y., assignor to Visual Programming, Inc., New York, N.Y., a corporation of New York
Continuation-in-part of application Ser. No. 352,045, Mar. 16, 1964. This application July 29, 1966, Ser. No. 568,827
7 Claims. (Cl. 35—9)

ABSTRACT OF THE DISCLOSURE

A teaching machine constituted by a film projector and a multiple-choice testing system. The projector includes an advance mechanism to sequentially shift a series of frames carried on a film strip, into the presentation position, some frames containing educational material and others containing multiple-choice questions based thereon. The testing system includes a rotary coding drum effectively divided into a circumferential series of longitudinal columns, the columns being divided transversely into a series of circular courses equal in number to the multiple choices. The drum is so driven by the advance mechanism of the projector whereby it indexes one column each time a new frame is advanced into the presentation position. Coding apertures are randomly distributed on the drum, there being only one aperture in each column at a single course point therein. A row of depressible switch contacts is provided in registration with a series of courses, whereby as the drum is stepped from column to column, only that switch is able to penetrate the drum which is aligned with the single coding aperture at the associated course point. An indicator is provided which is electrically actuated only when a selected switch contact penetrates the drum. The film frames are so arranged that for each frame containing multiple-choice questions, the corresponding column position on the drum will permit activation of the indicator only when the switch contact corresponding to the correct answer is depressed.

---

This invention relates generally to teaching machines, and more particularly to a machine of the type which presents programmed instruction material as well as multiple-choice questions based on such material. This application is a continuation-in-part of my copending application Serial No. 352,045, filed March 16, 1964, now abandoned.

Various forms of educational and testing devices are currently available which may be used by a student for self-teaching and drilling. Such teaching devices not only serve to present information relevant to the subject being taught, but also function to quiz the student's knowledge.

In one known form of teaching machine, the multiple-choice questions are carried on one or more frames on a film strip and are projected on a screen, the questions being consecutively numbered. The machine is equipped with a row of similarly numbered push-button operated electrical switches, and only when the student presses the button corresponding to the correct answer, is a light or sound indication given.

In order to correlate the testing system to the questions, the conventional practice is to provide the film strip which carries the questions with coded apertures or contacts which are sensed by the electrical testing system and serve to complete an electrical circuit to the correct answer indicator only when the button corresponding to the correct answer is actuated.

The difficulty with an arrangement of this known type is that it is not possible to use standard film for the teaching material, for it is necessary to modify the film strip to impart thereto coding apertures, or electrical contacts or whatever other expedients are used to coordinate the answers on a given frame of the strip with the push-button testing mechanism. This greatly adds to the expense of manufacture and complicates the operating structure.

In view of the foregoing, it is the main object of this invention to provide an improved teaching machine in which information and multiple-choice questions related thereto are carried on a series of standard frames on a film strip, the frame-by-frame advance of the strip being coordinated with a coding drum incorporated in a multiple-choice testing system, whereby only when the push-button switch corresponding to the correct answer is closed, will an indication be given.

A significant feature of the invention resides in the fact that conventional film may be used in the machine, devoid of coding apertures or contacts, the testing system being independent of the film structure.

Also an object of the invention is to provide a novel teaching machine of the above-described type in which replaceable cartridges, each containing a film reel, may be inserted, and in which the coding drum testing system is properly coordinated to the frames on the reel regardless of differences in subject-matter.

Thus one important advantage of the invention is that even though the film, per se, is conventional, the student may successively insert film cartridges containing different subject-matter, and then carry out multiple-choice questioning without regard to which cartridge is inserted. In this way the machine may be used with a large library of cartridges, without the need to make any adjustment in the testing system as different cartridges are used.

Also an object of the invention is to provide a teaching machine which incorporates an inexpensive optical projector of high efficiency.

Still another object of the invention is to provide a teaching machine of simple and reliable design, which may be mass-produced at low cost.

Briefly stated, these objects are accomplished in a teaching machine constituted by a film projector and a multiple-choice testing system. The projector includes an advance mechanism to sequentially shift a series of frames carried on a film strip, into the presentation position, some frames containing educational material and others containing multiple-choice questions based thereon. The testing system includes a rotary coding drum effectively divided into a circumferential series of longitudinal columns, the columns being divided transversely into a series of circular courses equal in number to the multiple choices.

The drum is so driven by the advance mechanism of the projector whereby it indexes one column each time a new frame is advanced into the presentation position. Coding apertures are randomly distributed on the drum, there being only one aperture in each column at a single course point therein. A row of depressible switch contacts is provided in registration with the series of courses, whereby as the drum is stepped from column to column, only that switch is able to penetrate the drum which is aligned with the single coding aperture at the associated course point. An indicator is provided which is electrically actuated only when a selected switch contact penetrates the drum. The film frames are so arranged that for each frame containing multiple-choice questions, the corresponding column position on the drum will permit activation of the indicator only when the switch contact corresponding to the correct answer is depressed.

For a better understanding of the invention, as well as other objects and further features thereof, reference is made to the following detailed description to be read in conjunction with the accompanying drawings, wherein:

FIG. 1 is a perspective view of a teaching machine in accordance with the invention;

FIG. 2 shows the machine with the casing removed;

FIG. 3 is a longitudinal section taken in the horizontal plane through the machine;

FIG. 4 in perspective shows the coding drum assembly and the row of pushbuttons cooperating therewith;

FIG. 5 is a transverse section of the machine taken in the vertical plane indicated by lines 5—5 in FIG. 3;

FIG. 6 is a transverse section taken through the coding drum assembly;

FIG. 7 is a perspective view of the film cartridge;

FIG. 8 is a perspective view of the coding drum assembly showing the coding cylinder separated from its supporting drum; and FIG. 9 shows in schematic diagram the electrical circuit of the machine.

Referring now to FIG. 1, there is shown a teaching machine in accordance with the invention, the machine being housed in a casing 10 and having a viewing screen 11 onto which images are optically presented from film frames contained on a reel supported within a cartridge 12. The film frames are advanced by means of a manually-operated dial 13.

When a film frame is projected, it may contain either educational material or a question based thereon, followed by a series of possible answers, only one of which is correct. Thus, shown on screen 11 is the text of a question Q, followed by a series of possible answers A, B, C and D. Provided on the machine is a row of bush buttons a, b, c and d which depress electrical switches. The student being questioned presses the button whose letter identification corresponds to what he believes to be the correct answer. In the event his choice is correct, a light indicator 14 will be illuminated and a buzzer will sound.

As best seen in FIGS. 5 and 7, the film cartridge 12 is constituted by a plastic housing 15 which encloses a spring-loaded reel 16 onto which is wound a strip of film 17. The film unwound from the reel passes a duct extension 18 integral with the housing, the end of this extension being provided with a pair of spaced slots 18a and 18b which are positioned to expose the sprocket holes on the film. As will be seen in FIG. 7, the film strip 17 is made up of a series of frames 17a, etc., the frames being bordered by a continuous chain of sprocket holes 17b and 17c. In practice I have printed the film strip with sixteen frames per foot as against the conventional eight frames to maximize the use of film within the available cartridge space.

The cartridge, as evident in FIG. 5, is inserted in an opening on the top side of casing 10, the duct extension 18 projecting into the casing, and the housing 15 resting on top thereof. When the duct extension is inserted, the sprocket holes on the film are engaged by a pair of sprocket wheels 19 and 20 (FIG. 3) keyed to a shaft 21, the wheels being received within slots 18a and 18b of the duct. The shaft 21 extends outside of the casing and terminates in the advance dial 13.

The film advanced by the sprocket wheels 19 and 20 passes through a projector window 22 and curls into a reservoir 23 at the bottom of the casing. Thus by rotating the dial 13 in one direction, the film is advanced frame by frame through projector window 22, the film being unreeled from the cartridge and being stored in the reservoir. When the dial movement is reversed, the film is returned to the cartridge and when fully taken up on the reel therein, the cartridge may be removed from the machine.

In lieu of a rotary advance system, an automatic push button step system may be used in which a solenoid actuated mechanism serves to advance the film step by step. It is also to be noted that the cartridge-projector arrangement shown herein is also useful as a film or slide projector entirely apart from programmed teaching functions.

As best seen in FIGS. 3 and 5, the projector section of the machine further includes a light bulb 24 preferably of the low voltage (12 volts), high-brilliance type used in automobile headlamps. Light from the lamp is directed by a back reflector 25 into a condenser lens barrel 26 and from there through the window 22 into a projector lens 27. The condenser lens 26 serves to provide a uniform field of intense light, whereas the projector lens 27 casts the image of the film frame lying in the window onto a reflecting mirror 28, which directs the enlarged image onto screen 11. The operating voltage for the projector bulb 24 is obtained from a stepdown transformer 29 connected to the power line through a main switch 30 mounted on the front panel of the machine.

As shown in FIGS. 4 and 8, a coding drum assembly is provided which is constituted by a metallic drum 31 mounted for rotation between bearings 32 and 33 on a shaft 34. Rotation of the drum is effected by a pulley wheel 35 mounted on the same shaft. The pulley wheel 35 is linked by a continuous chain 36 to the advance shaft 21 of the projector, the chain encircling a grooved collar 37 keyed to a shaft 21. Telescoping over drum 31 is an apertured coding cylinder 38 of insulating material.

Coding cylinder 38, as best seen in FIG. 8, is effectively divided into a series of longitudinally extending columns. We shall assume, by way of example, that the cylinder is divided into twenty columns I to XX, of equal width.

The ratio between the diameter of collar 37 on the advance shaft 21 and that of the pulley wheel 35 on the drum shaft is made such that when the advance shaft is rotated to an extent sufficient to shift one film frame out of the projector window and to advance the next frame into the projection position, the drum is at the same time indexed one column position. In practice I have used a 5 to 1 ratio when the film frame size is 16 per foot.

Push buttons a, b, c and d, as best seen in FIG. 4, actuate flexible switching contact arms Ca, Cb, Cc and Cd, respectively, having humped contact portions Ca', Cb', Cc' and Cd', which are dimensioned to be receivable within apertures 39 randomly distributed on drum cylinder 38 when a contact portion is aligned with an aperture. The contact portions Ca', etc. lie along a line parallel to the columns on the cylinder.

Columns I to XX on cylinder 38 are effectively divided transversely into circular courses Ta, Tb, Tc and Td, as shown in FIG. 8, equal in number to the number of possible answers, a, b, c and d. The apertures 39 are so distributed on the drum that within each column I to XX at one course point therein, there is a single aperture, but from column to column the aperture position is in no particular order and is in fact, random.

Assuming, therefore, that when the first frame on the film occupies the projection position, the first cylinder column I is at the same time in line with the contacts Ca, Cb, Cc and Cd, then only one of these contacts will be able to enter within the single aperture in that column. The electrical circuit is such that when the contact is admitted into the aperture of the insulating cylinder, it engages the metal of the drum to complete a circuit to the correct-answer indicator 14.

Even though the apertures are randomly distributed, their position is known. For example, in FIG. 8, in colunm I, the aperture is at course point Ta, in column II, at course point Tc, at column III, at course point Td, and at column XX, at course point Tb.

Since the code distribution is known, the answers on any of the corresponding first twenty frames on each film reel may be prearranged so that regardless of subject-matter, there is a proper match between the correct answer and the related coding aperture. With the next twenty frames on the reel, the code pattern is repeated as the drum is caused to go through a second revolution. The number of revolutions made by the drum depends on the ratio of drum columns to the number of frames on the reel. If therefore the reel has 110 frames, and the drum 20 columns, the drum will make 5½ revolutions.

Hence from cartridge to cartridge, assuming that each has twenty frames, one decides in advance which frames are to contain a multiple-choice question. The frames selected for this purpose vary from cartridge to cartridge, for the subject-matter of the cartridges is different. Since for every one of the twenty frames, one knows the course position of the aperture in the corresponding column on the coding drum assembly, one has merely to arrange the choice of answers so that the correct answer on the frame matches the particular aperture, whereby when the associated button is pressed, an indication of correctness will be given.

It will be obvious that in order for the system to function correctly, the first column of the drum must at the outset be operatively related to the row of switches when the first frame is presented for projection. To this end, the drum is provided with a marker contact 40 which at a predetermined angular position of the drum engages a switch contact 41 to close a circuit to indicator lamp 42. Thus, before the cartridge is inserted, the advance dial is turned until the drum reaches the point at which indicator lamp (red) 42 is illuminated. Then the cartridge is inserted, and when the first frame is advanced into the window, the drum at that point has its first column operative.

The surface of drum 31 is always engaged by a sliding contact 43 which is connected to one end of the secondary of transformer 29, the other end being connected to the indicators 14 and 42 through the various circuit switches. The questioning circuit is energized only when a cartridge 12 is inserted; this being accomplished by means of a switch 44 (FIG. 5) which is actuated only when a cartridge is inserted in the casing.

Referring now to FIG. 9, the operation of the device will now be reviewed in terms of the electrical circuit. It will be seen that step-down transformer 29 is connected through switch 30 to a power line; hence when this switch is closed, a low A-C voltage (12 volts) is available at the secondary winding of the transformer to immediately energize the projector lamp 24.

The indicator lamp 42, which is used to align the position of the drum assembly (31, 38) is connected to the secondary winding of transformer 29 through the contact 41. When contact 41 engages drum 31 at the proper angular position of the drum, the connection to the lamp is through sliding contact 43.

Once the drum is given its initial setting by turning advance dial 13, the cartridge 12 is then inserted to actuate switch 44. This serves to connect the answer lamp 14 and a buzzer 45 parallel therewith across the secondary of the transformer through the coding assembly. Switch 44 when actuated by the cartridge also at the same time breaks the circuit to red lamp 42, hence when the drum again occupies a position at which contact 41 is engaged the red light will not go on. The circuit to answer lamp 14 is completed only when one of contacts Ca, Cd, Cc and Cd engages drum 31 through an aperture 39.

While there has been shown a preferred embodiment of a visual aid teaching machine in accordance with the invention, it will be appreciated that many changes and modifications may be made therein without, however, departing from the essential spirit of the invention.

Thus while in the embodiment shown, the activation of the indicator lamp is effected only when one of the push buttons a, b, c, and d actuates that switching contact arm Ca, Cb, Cc or Cd which penetrates a particular coding aperture in cylinder 38 to engage conductive drum 31, the same result may be accomplished in other ways. For example, in lieu of apertures, one may use contact pieces on the coding drum, all of which are connected to their underside to a common slip ring engaged by sliding contact 43. Hence when one of the switching contact arms engages the single contact piece in alignment therewith, the indicator is activated to provide an indication of a correct answer.

It is therefore intended in the annexed claims to encompass the various embodiments of this invention.

What I claim is:
1. A teaching machine comprising:
(A) a film projector for a film strip having a series of information frames interspersed with related question frames and provided with an advance mechanism to shift said frames for consecutive presentation on a screen, said question frames each being in the form of a multiple-choic question, and
(B) a testing system including:
(a) an indicator to indicate whether a student's choice with respect to a particular multiple-choice question is correct,
(b) a row of manually actuable members equal in number to the number of choices in the multiple thereof,
(c) a rotary coding drum separate from said projector and effectively divided into a circumferential series of longitudinal columns, which columns are divided transversely into a series of circular courses equal in number to said number of choices,
(d) means operatively coupling said drum to the advance mechanism of said projector to cause the drum to index one column each time a new frame is advanced into a presentation position, the number of columns in the series thereof on the drum being a fraction of the number of frames in the series thereof on the film strip whereby the drum makes more than one turn in the course of a full advance of the film strip,
(e) coding elements randomly distributed on said drum, there being only one element in each column at a single course thereon, said row of manually actuable members being in registration with said series of courses, whereby as the drum is stepped from column to column the only member which is engageable with the element at the associated course is that member aligned therewith, and
(f) means responsive to the engagement of a member and an element to actuate said indicator to provide an indication of the correct answer.

2. A teaching machine comprising a film projector for a film strip having a series of information frames interspersed with related question frames and provided with an advance mechanism to shift said frames for consecutive presentation on a screen, said question frames each being in the form of a multiple-choice question, and a testing system having an indicator to indicate whether a student's choice is correct and including a row of depressible switches corresponding to said multiple-choice question, a rotary coding drum separate from said projector and effectively divided into a circumferential series of longitudinal columns, which columns are divided transversely into a series of circular courses equal in number to the multiple choices, means operatively coupling said drum to said advance mechanism to cause it to index one column each time a new frame is advanced into a presentation position, the number of columns in the series thereof on said rotary coding drum being a fraction of the number of frames in the series thereof on said film strip whereby the drum makes more than one turn in the course of a full advance of the film strip, coding apertures randomly distributed on said drum, there being only one aperture in each column at a single course therein, said row of switches being in registration with said series of courses, whereby as the drum is stepped from column to column, only that switch penetrates the drum which is aligned with the single coding aperture at the associated course, and means to complete an electrical circuit between said indicator through the penetrating switch to provide an indication of the correct answer.

3. A teaching machine comprising a film projector for a film strip having a series of information frames interspersed with related question frames and provided with an advance mechanism to shift said frames for consecutive presentation on a screen, said question frames each being in the form of a multiple-choice question; and a testing system having an indicator to indicate whether a student's choice is correct and including a row of depressible switches corresponding to said multiple-choice question, a rotary coding drum separate from said projector effectively divided into a circumferential series of longitudinal columns, which columns are divided transversely into a series of circular courses equal in number to the multiple choices, said drum being of conductive material and being surrounded by an insulating cylinder, means operatively coupling said drum to said advance mechanism to cause it to index one column each time a new frame is advanced into presentation position, the number of columns in the series thereof on said rotary coding drum being a fraction of the number of frames in the series thereof on said film strip whereby the drum makes more than one turn in the course of a full advance of the film strip, coding apertures randomly distributed on the insulating cylinder on said drum, there being only one aperture in each column at a single course therein, said row of switches being in registration with said series of courses, whereby as the drum is stepped from column to column, only that switch which is aligned with the single coding aperture at the associated course makes contact with the drum, and means to complete an electrical circuit between said indicator through the contacting switch to provide an indication of the correct answer.

4. A testing machine as set forth in claim 3, further including means to indicate when the drum occupies an initial position.

5. A testing machine as set forth in claim 3, wherein said projector includes a low voltage light source and a condenser lens to collect light from said source and to direct it through said film.

6. A testing machine as set forth in claim 3, wherein said film strip is contained in a spring loaded reel in a cartridge, whereby when the advance mechanism direction is reversed, the film is rewound on the reel.

7. A teaching machine comprising a film projector for a film strip having sprocket holes, a series of information frames interspersed with related question frames and provided with dial-operated advance mechanism including a sprocket wheel engaging said holes to shift said frames for consecutive presentation on a screen, said question frames each being in the form of a multiple-choice question; and a testing system having an indicator to indicate whether a student's choice is correct and including a row of depressible switches corresponding to said questions, a rotary coding drum separate from said projector and effectively divided into a circumferential series of longitudinal columns, which columns are divided transversely into a series of circular courses equal in number to the multiple-choices, means linking said sprocket wheel to said rotary drum and having a gear ratio causing the drum to index one column each time a new frame is advanced into presentation position in said projector, the number of columns in the series thereof on said rotary coding drum being a fraction of the number of frames in the series thereof on said film strip whereby the drum makes more than one turn in the course of a full advance of the film strip, coding apertures randomly distributed on said drum, there being only one aperture in each column at a single course therein, said row of switches being in registration with said series of courses, whereby as the drum is stepped from column to column, only that switch can be depressed which is aligned with the single coding aperture at the associated course, and means to complete an electrical circuit between said indicator through the depressed switch to provide an indication of the correct answer.

References Cited

UNITED STATES PATENTS

| | | | |
|---|---|---|---|
| 2,911,741 | 11/1959 | Boyer | 35—9 |
| 2,983,054 | 5/1961 | Twyford | 35—9 |
| 3,096,592 | 7/1963 | Schuster | 35—9 |
| 3,221,418 | 12/1965 | Hoernes et al. | 35—9 |

EUGENE R. CAPOZIO, *Primary Examiner.*

W. W. NIELSEN, R. WEIG, *Assistant Examiners.*